United States Patent [19]

Tanner et al.

[11] Patent Number: 5,381,567
[45] Date of Patent: Jan. 17, 1995

[54] MOBILE EMERGENCY EYEWASH AND BODY SPLASH APPARATUS

[75] Inventors: Stephen F. Tanner; Christopher J. Bollas, both of Houston, Tex.

[73] Assignee: Encon Safety Products, Houston, Tex.

[21] Appl. No.: 123,288

[22] Filed: Sep. 20, 1993

[51] Int. Cl.6 .............................................. B60R 15/02
[52] U.S. Cl. ............................................................ 4/620
[58] Field of Search ........................... 4/620, 601, 603; 239/543, 544, 172

[56] References Cited

U.S. PATENT DOCUMENTS

| | | | |
|---|---|---|---|
| 3,106,722 | 10/1963 | Logan et al. | 4/620 X |
| 3,792,814 | 2/1974 | Platz | 239/172 X |
| 4,084,270 | 4/1978 | Kersten, Jr. | 4/620 X |
| 4,847,928 | 7/1989 | Fey | 239/172 X |
| 5,157,798 | 10/1992 | Van Kammen | 4/620 |

Primary Examiner—Andres Kashnikow
Assistant Examiner—Kevin P. Weldon
Attorney, Agent, or Firm—Jenkens & Gilchrist; John R. Kirk, Jr.

[57] ABSTRACT

Disclosed is an a mobile emergency eyewash and bodysplash apparatus for delivering water for cleaning chemical irritants from eyes or skin. The apparatus includes a water tank housing which holds a water tank. A second housing contains a drench nozzle and eyewash fountain, both of which are connected by tubing to the water tank. The second housing is slidably and rotatably mounted on top of the water tank housing. The apparatus generally is positioned in the back of a pickup truck, so that during operation, the drench nozzle and eyewash fountain housing is slidably moved from the top of the water tank housing and rotated into place on the side of the truck. A panel on the second housing is opened to reveal the drench nozzle and eyewash fountain.

16 Claims, 6 Drawing Sheets

MOBILE EMERGENCY EYEWASH AND BODY SPLASH APPARATUS

BACKGROUND OF THE INVENTION

1. Summary of the Invention

The present invention relates to safety or first aid apparatus. In another aspect, the present invention relates to mobile safety or emergency apparatus. In still another aspect, the present invention relates to mobile safety or first aid apparatus for treating skin and eye exposure to hazards of chemical splashes.

2. Description of the Related Art

Worker exposure to chemical hazards is a safety issue that reaches across industry lines concerning not only workers in such obvious industries as the petrochemical and chemical industries, but also includes such other industries, such as, for example, agriculture where workers may suffer exposure to chemicals such as pesticides.

Various federal and state occupational and safety health agencies address the problem of worker exposure to chemical hazards and require certain types of equipment to be available for first aid response in the event of skin and eye exposure to chemical hazards. Such first aid equipment generally includes emergency showers and eyewash stations.

For example, in California, CAL-OSHA standard 8CCR 5162 is the general industry regulation requiring the installation of emergency shower and eyewash equipment in potentially hazardous areas, many of which may be remote from permanent facilities having an abundance of facilities and treated water. The shower requirements are detailed in Section B which references ANSI Z358.1-1981, section 4 or 9, as the equipment standard. For instance, now eyewash fountains are required wherever there are activities proceeding for maintaining pipelines, which are well known to run through remote terrain. Simplisticly, eyewash capability must now be present wherever there are workmen.

Section 4 of ANSI Z358.1-1981 details the requirements for shower equipment performance, installation, test procedures, maintenance and training. Under this section, safety showers are required to provide a minimum of 30 gallons of potable water per minute, creating a substantially disbursed pattern not less than 20 inches in diameter, 60 inches above the level on which the user stands. The recommended minimum drench time in an emergency shower is 15 minutes to fully irrigate and dilute a chemical exposure.

Over 450 gallons of water, weighing over 3700 pounds is required to meet this standard, creating a hardship when a work site is temporary or without any hard plumbed potable water facilities.

The remote work site in pipeline exploration and production industries and agriculture also have to contend with off-road logistics, limiting the vehicles selected and used in regularly scheduled activities. For these work groups, it is not practical nor sometimes even possible to transport nearly 4000 pounds of water and first aid equipment to these sites.

A drench hose for irrigating a portion of the body is a viable alternative to showers which cascade water over the entire body in these remote locations. Drench hoses are described in section 8 of ANSI Z358.1 1990 standard as single stream products designed to provide a controlled flow of potable water to a portion of the body at a velocity low enough so not to be injurious to the user. Because of the inability to wash both eyes simultaneously, drench hoses do not serve as suitable eyewash facilities. Drench hoses are required to proved a minimum of 3.0 gallons of potable water per minute, but currently lack a minimum stay requirement.

One attempt to solve the problem was to install a portable drench hose and eyewash station into the side of especially designed compartmental bodies for a utility truck. However, these prior art units are limited since they are not transferable from truck to truck, and cannot easily be removed from the truck and set up at a remote job site to allow other use of the truck. Therefore, the need remains for easily portable eyewash and drench equipment which will satisfactorily operate from a number of readily available vehicles, such as pickup trucks and, at the same time, be removable to set up at a remote work site.

SUMMARY OF THE INVENTION

According to one embodiment of the present invention there is provided a mobile eyewash and bodysplash apparatus easily positioned in, and operated from, the bed of a pickup truck for delivering water and apparatus for emergency cleaning of chemical irritants from eyes or skin at remote work sites. The apparatus includes a water tank housing which either holds a water tank or serves as such a tank itself. A second housing contains the emergency apparatus, i.e., a drench nozzle and/or an eyewash fountain, both of which are connected by tubing to receive water from the water tank. The second housing is slidably and rotatably mounted on top of the water tank housing in the horizontal stored position and is movable to an operating vertical position. The apparatus generally is configured to be easily positioned in the back of a pickup truck, so that during operation, the drench nozzle and eyewash fountain second housing is slidably moved from the top of the water tank housing along a line transverse the longitudinal axis of the truck and rotated into verticle operating position where it is steadied by a releasable locking pin against the side of the truck. This locking means limits motion of the apparatus when the drench hose is extended for use. A panel on the second housing is opened to reveal the drench nozzle and/or eyewash fountain in a stored position which can be easily moved to an accessible operating position.

DETAILED DESCRIPTION OF THE INVENTION

Referring now to FIGS. 1-6, there is shown portable drench hose and eyewash station 40 of the present invention.

Figure 1:
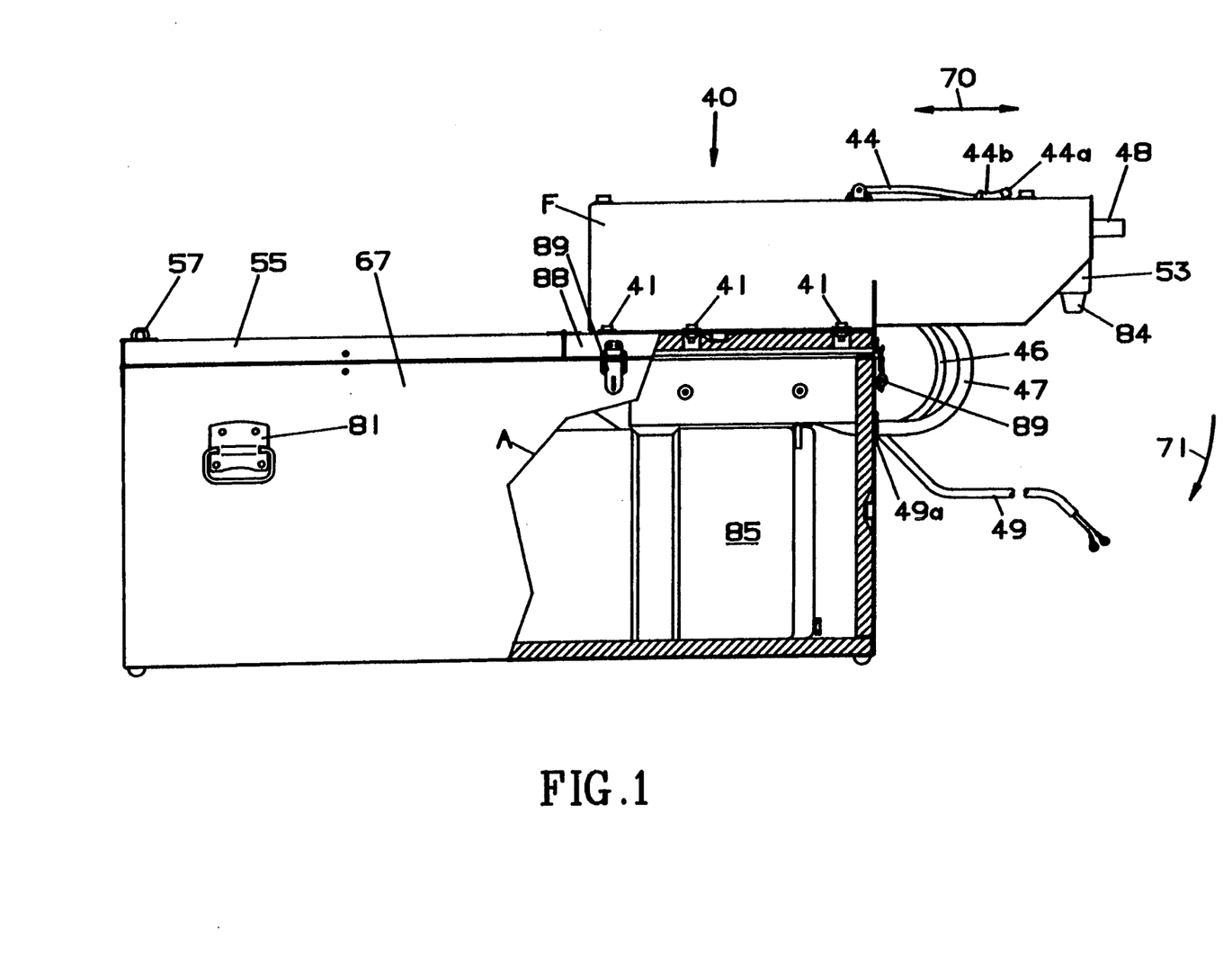
FIG. 1 is an elevation side view, partially sectioned, of the apparatus 40 of the present invention showing the second housing 53 in its first horizontal traveling position.
Figure 2:
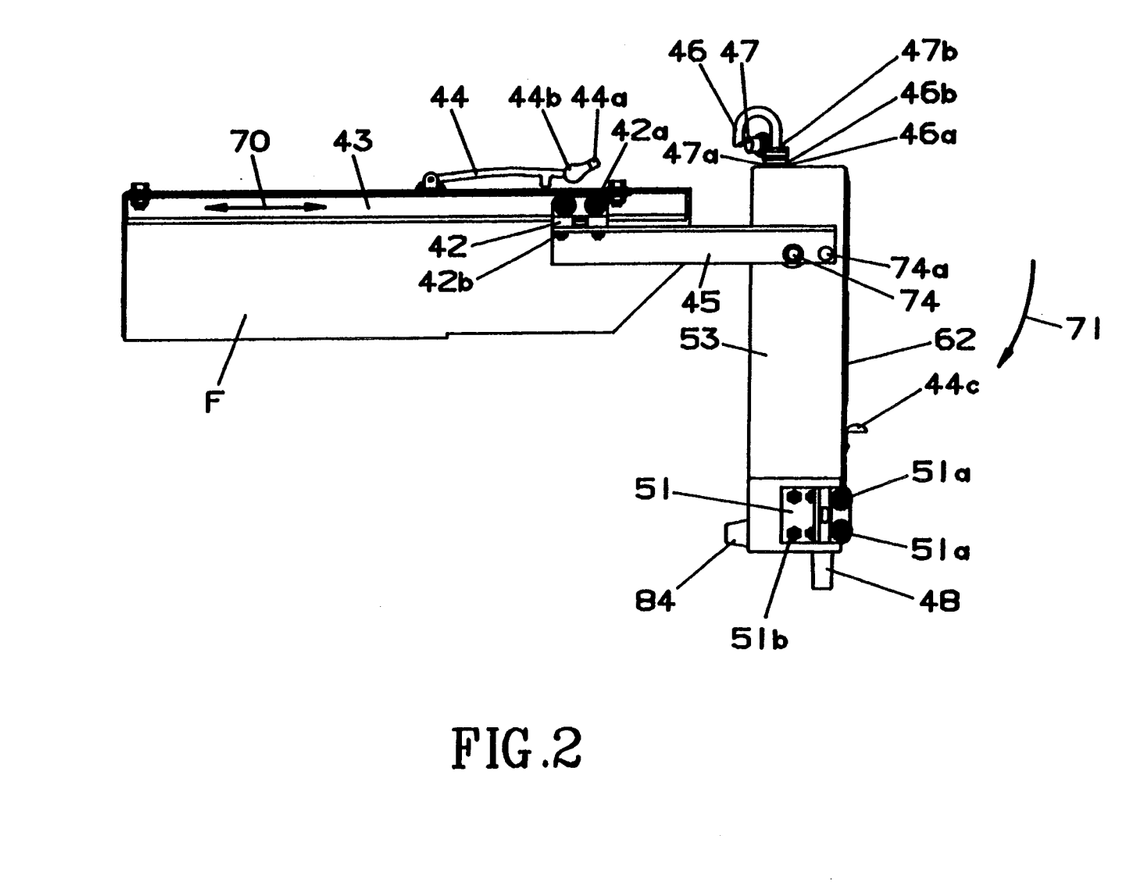
FIG. 2 is an elevation side view and shows drench hose and eyewash fountain housing 53 rotated from the horizontal traveling position shown in FIG. 1 and into a vertical position for operation.
Figure 3:
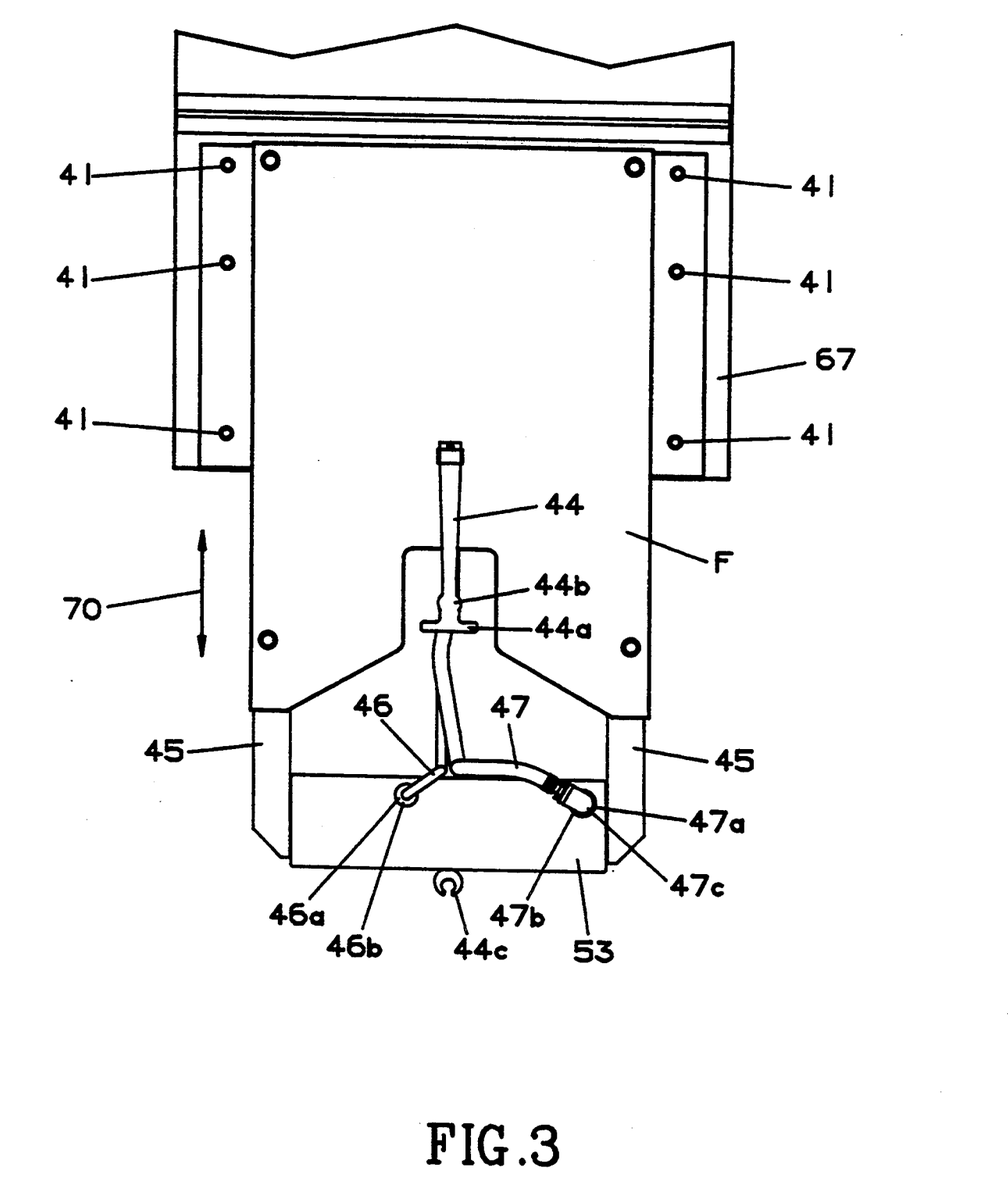
FIG. 3 is a top view of the second housing 53 showing hoses and hose connections.

FIG. 1 shows drench hose and eyewash fountain housing 53, first or water tank first housing 67 containing water tank 85, and frame F connecting housing 53 and housing 67, in the first or travelling position. FIG. 2 is a cutaway version of frame F and housing 53, in the second, or vertical, operational position. FIG. 3 is a top view of the frame F and housing 53 in the second or operational position.

As shown in FIG. 1, water tank (first housing) housing 67 is cut away at line A to reveal water tank 85. Drench hose and eyewash fountain (second housing) housing 53 is slidably attached through frame F to water tank housing 67. Here, the second housing 53 is showed stowed within frame F. As shown in FIG. 2, roller brackets 42, with rollers 42a, slidably attach the first end of sliding arms 45 to roller track 43 of frame F. Roller brackets 42, attached to Frame F by common fasteners 42b, are adapted to be received into and roll along track 43. The second end of sliding arms 45 are pivotably attached to second housing 53 by pivot pins 74. Frame F is attached to the top of water tank housing 67 using common fittings 41, which may be rivets, metal screws, nuts and bolts or the like. Roller brackets 51 with rollers 51a are mounted on each side of housing 53 using common fasteners 51b. Roller brackets 42 and 51, pivot pins 74 and sliding arm 45 allow drench hose and eyewash fountain housing 53 to be slidably moved across the top of water tank housing 67, in directions indicated by arrow 70, to and from its normal resting place using handle 48. Strap 44 secures housing 53 in its first horizontal traveling position within frame F and on top of housing 67 when the station is not in operation by attaching a hasp 44a on handle 44b to hook 44c on the second housing 53. To move second housing 53 into the second or vertical position for operation, handle 48 is used to slide second housing 53 through frame F and pivot second housing 53 on pivot pin 74 in the direction shown by arrow 71. The second housing 53 is secured in the vertical second position by a locking means 74a, here shown as the preferred spring loaded plunger 74a which must be pulled to allow the second housing 53 to return to its first horizontal position.

FIG. 2 is a side elevation view and shows drench hose and eyewash fountain housing 53 rotated from the travelling or horizontal first position shown in FIG. 1 and into the vertical or operational second position. Drench hose and eyewash fountain housing 53, slidably and rotatably attached to water tank housing 67, is positioned into place by using handle 48 to slide housing 53 along track 43 and rotate it into place at pivot pin 74 and locks by movement of the spring loaded plunger 74a into a corresponding hole in second housing 53. While second housing 53 rests against the side of the pickup truck, when not being used in the stand-alone mode, the locking means 74a secures the second housing 53 against unwanted movement during operation.

FIG. 3 is a top view of the frame F and housing 53 in the second or operational position. Water hose 47, which connects the drench hose and eyewash fountain with the water tank, can now be seen entering housing 53 through standard fittings at water hose opening 47b and standard elbow fitting 47c. Water hose 47 extends through first housing 67 through a grommet 80 to protect the hose and is attached through to tank 85 using standard, well known fittings to the pump in the tank.

Electrical line 46, which connects the electrical circuitry of the drench hose and eyewash fountain with electrical relay/controller box 93 (FIG. 6), is shown entering housing 53 through standard fittings at opening 46b. Electrical line 46 extends into housing 67 through a grommet 80 to protect the electrical line and is attached to box 93 using standard, well known electrical connectors.

Figure 4:
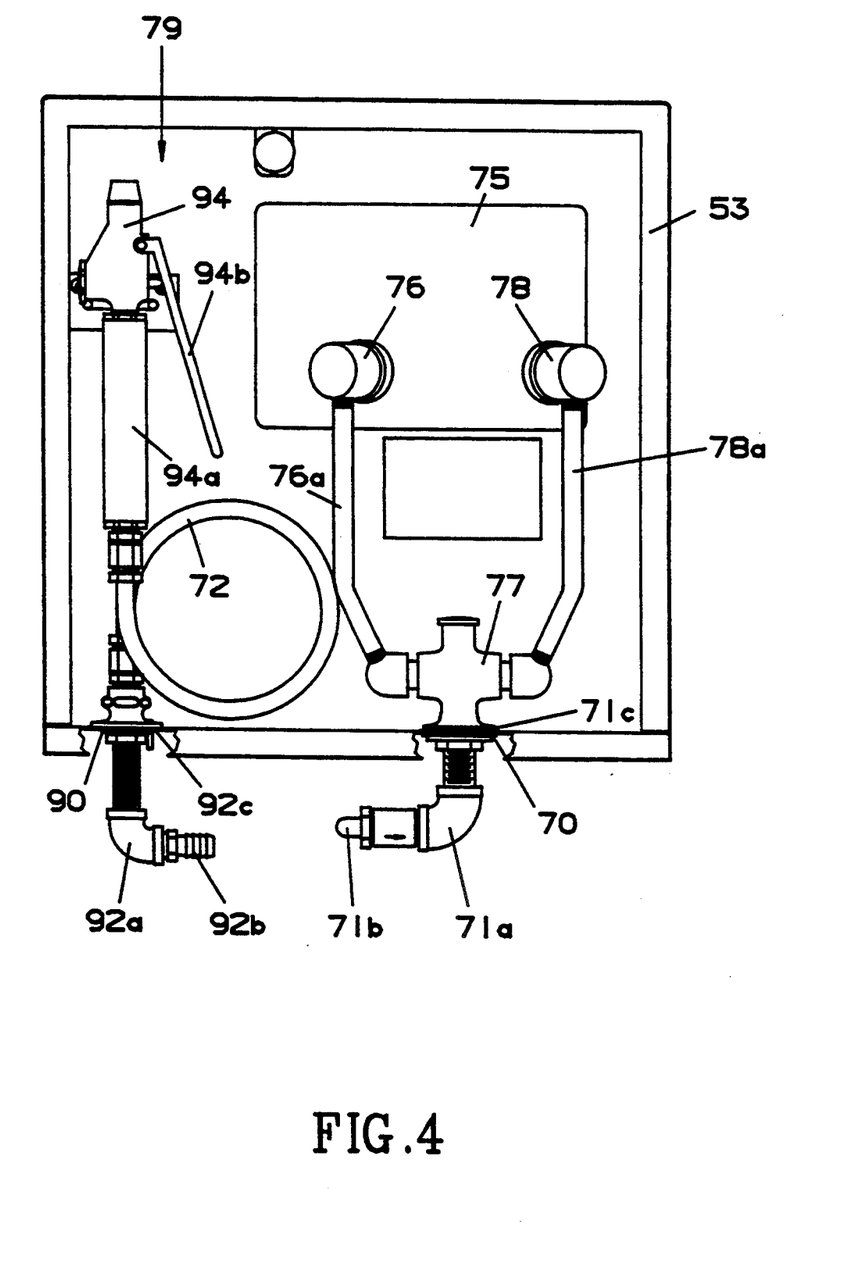
FIG. 4 is an elevation view of the interior of the second housing and shows the opened drench hose and eyewash fountain housing 53 revealing drench hose 79 and eyewash fountain 75, with eyewash sprayers 76 and 78 shown in their closed or at rest position.
Figure 5:
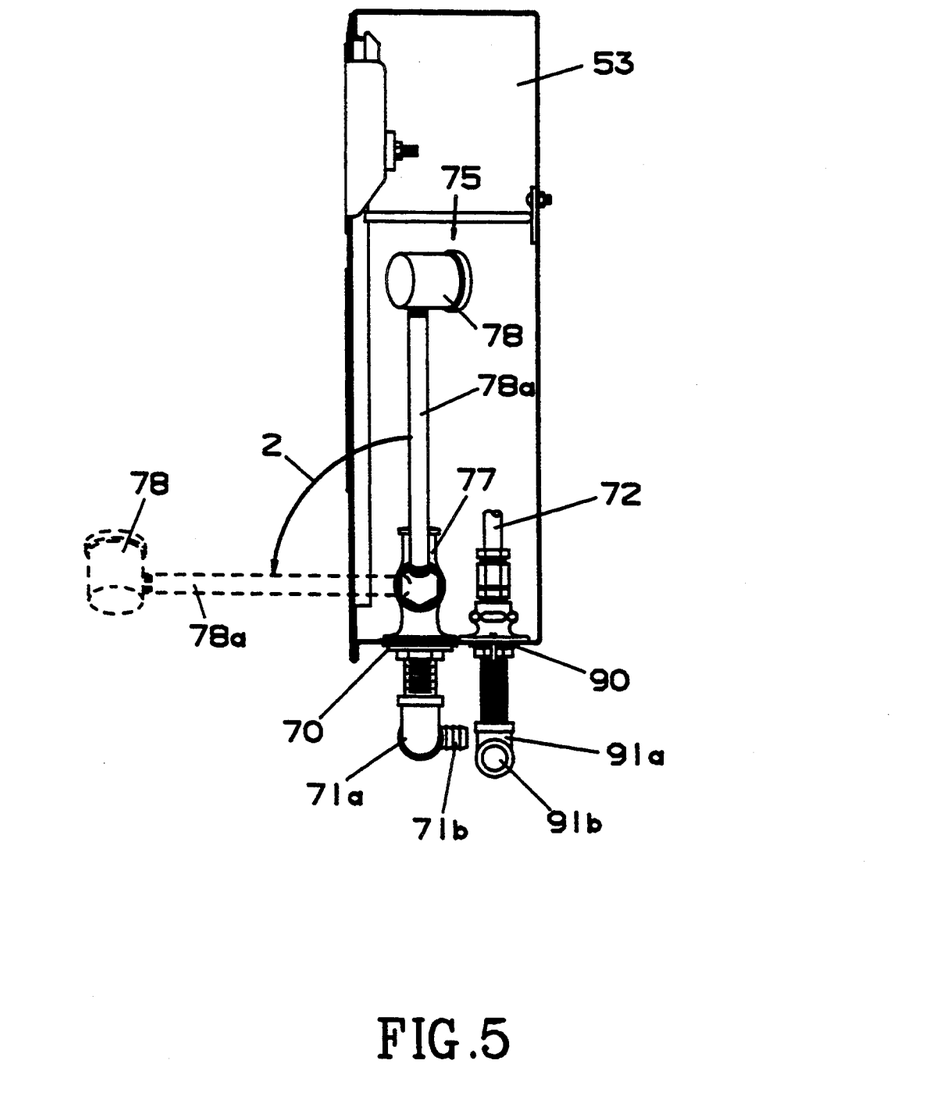
FIG. 5 shows an elevation side view of second housing 53 of the present invention the eyewash fountains 76 and 78 in closed and operational . . . position.

FIGS. 4 and 5 are front and side views, respectively, of second housing 53, with housing panel 62 removed revealing drench hose 79 and eyewash fountain 75.

Drench hose 79 further includes hand nozzle 94 with hand grip 94a and squeeze handle 94b, and a coil of hose 72 which allows the user to direct water to a desired area. Water is supplied to the hand nozzle 94 from the water tank 85 inside the first housing 67 via hoses 72 and 47. Hose 72 is connected to hose 47 through passage 90 in housing 53 via elbow 92a and fittings 92b and 92c.

Eyewash fountain 75 further includes a pair of appopriately spaced eyewash spray heads 76 and 78 mounted on arms 76a and 78a, respectively, which pivot into operation at pivot joint 77 in direction shown by arrow 2. Water is supplied to eyewash fountain 75 from water tank 85 via hose 47, which is connected to fountain 75 through passage 70 in housing 53 via elbow 71a and fittings 71b and 71c.

Although not shown, hose 47 divides through a conventional fitting and connects to both eyewash fountain 75 and drench hose 79. In the embodiment shown, hose 47 is shown entering the top of second housing 53 and obviously connects to eyewash fountain 75 and drench hose 79 at the bottom of housing 53 as shown. It is understood that the connection of eyewash fountain 75 and drench hose 79 to hose 47 is not so limited, and that hose 47 may be connected to fountain 75 and hose 79 by any suitable path.

In FIG. 5, eyewash spray heads 76 and 78 are shown in both their standard position (as indicated by solid lines) and their emergency operational position (as indicated by dashed lines). To flush the eyes, the user's eyes are positioned immediately above eyewash spray heads 76 and 78. A water pump 91 generally housed in water tank housing 67 and connected to the vehicle battery or other electrical power source via electrical line 49, is automatically activated upon demand by well known switching techniques when eyewash spray heads 76 and 78 are pulled downward into operational position or when hand nozzle 94 is squeezed.

Figure 6:
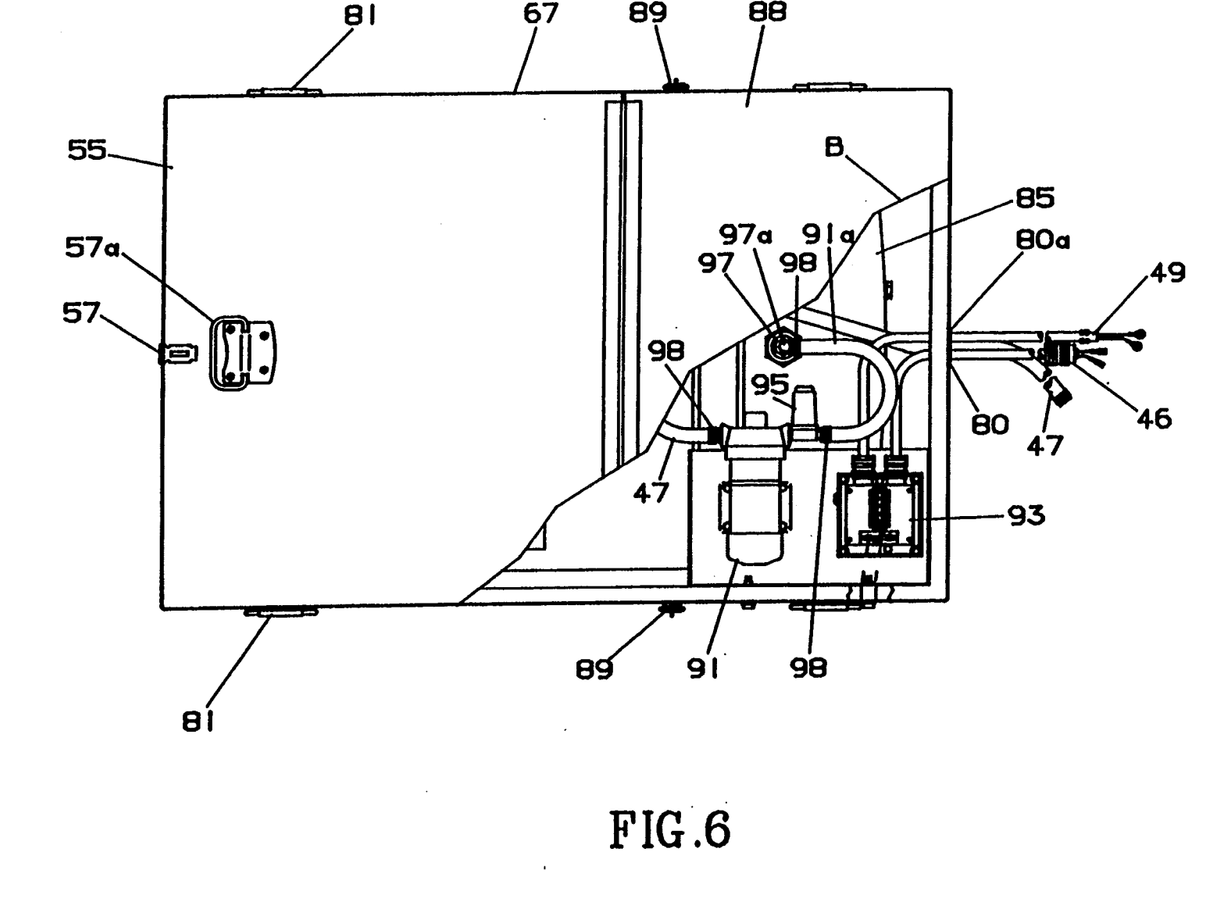
FIG. 6 is a top view, partially in section, and shows the first housing of the present invention in which water is stored to reveal positioning of the pumps and electricals.

FIG. 6 shows a top view of first or water tank housing 67. As shown, first housing 67 is cut away at line B to reveal tank 85, pump 91, electrical box 93 and associated electrical and plumbing lines.

For normal maintenance and filling, access to water tank 85 is gained by opening water tank housing lid 55 with latch 57 and handle 57a. Complete access to water tank 85 may be gained by opening water tank housing lid 88 after releasing latches 89.

Pump 91 pumps water from tank 85 via hoses 91a and 47 to the drench hose 79 and eyewash fountain 75. Hose 91a is connected to tank 85 through opening 97 in tank 85 via fitting 97a. Filter 95, connecting hose 91a and pump 91, is designed to remove any particles in the water that might cause harm a users' eyes. In the embodiment shown, fittings 98 are common fittings such as hose clamps. Electrical lines 46 and 49 and water hose 47 leave first housing 67 through passage 80 surrounded by grommet 80a. The apparatus 40 may draw its power from the 12 Volt system of the pickup truck host or from any 12 Volt system on site.

In operation, apparatus 40 of the present invention is generally placed in the bed of a pickup truck. Apparatus may be easily moved using handles 81. Water tank housing 67 generally rests in the pickup truck bed, with eyewash fountain and drench hose housing 53 in the operational position over the side of the truck bed, with bumper 84 resting against the side of the truck body. To facilitate access to the eyewash fountain 75 and drench hose 79, panel 62 is generally adapted to be rotated about 180° to thus hang straight down from second housing 53. Water pump 91 is automatically activated to supply water upon demand when eyewash spray heads 76 and 78 are pulled downward into operational position or when hand nozzle 94 is squeezed.

As it is expected the apparatus 40 of the present invention will generally be utilized in remote job sites, many of them off the beaten path, apparatus 40 will generally be constructed with materials and in such a manner as to withstand off road driving and travel. Additional hazards for the apparatus to endure include collisions with tools and other cargo common in the back of a worker's pickup truck.

Water tank 85 of the present invention will generally be constructed from materials noncorrosive by potable water. Tank 85 will generally require a capacity sufficient to supply 15 minutes of water through the drench hose and eyewash sprayers. At a minimum of 3.0 gpm for drench hose 94 or 0.4 gpm for the eyewash system, this requires about 50 gallons. A margin of safety in the capacity of at least about 10 percent will generally be required. Since the apparatus of the present invention will be utilized at remote job sites, tank 85 must be insulated so as to prevent excessive heat gain or loss from extreme exposures, defined as above 95° F. and below −20° F. Generally for cold climates, a heating element will be utilized either in or around tank 85 to prevent freezing. Loading of the water into water tank 85 may be appropriately delayed until the truck carrying the apparatus of this invention into the field in order that the weight for offloading from the pickup truck if desired, might be made easier.

The water pump utilized in the present invention is generally housed in water tank housing 67, is automatically activated upon demand when eyewash spray heads 76 and 78 are pulled downward into operational position or when hand nozzle 94 is squeezed. The water pump is generally sized to supply water according to safety and health regulations which currently require at least 3 gpm water for the drench nozzle 94 and at least 0.4 gpm for the eyewash spray heads 76 and 78. As a safety measure to protect the eyes from debris, a straining device 91 is utilized on the suction side of the pump. The water pump is generally adapted to run off of a 12 volt DC system, and will be powered either by its own battery or connected to the truck battery via electrical line 49.

Apparatus 40 of the present invention may further include a means to determine when tank 85 is low and requires more water. Such means includes a level gauge or other measuring device, or even a low warning indicator. The emergency wash apparatus of this invention is designed to be easily stored and maintained in a warehouse or shop until needed in the field and can be easily lifted with the bed of a pickup truck and positioned such that second housing 53 containing either the eyewash fountain 75 or the drench nozzle 94 or both is securely resting against the outer bed when in its second vertical operating position. It would then be filled with water and transported to the field and placed in operating configuration in the truck bed or removed and placed on a suitable stand for operation.

From the foregoing description of the preferred embodiment of this invention, those skilled in the art to which the invention pertains may make many obvious changes and modifications without departing from the scope of the appended claims.

We claim:

1. A mobile emergency washing apparatus transportable by a pickup truck having a bed comprising:

a first housing removably carried within the bed of said pickup truck and having a tank mounted in said housing;

a second housing carrying emergency wash apparatus said second housing being slidably and pivotably connected to said first housing and moveable between a first traveling position at which the second housing is secured vertically above said first housing and a second operating position at which the second housing is horizontally spaced from said first housing;

a means for moving the second housing between the first and second positions;

a means for locking the second housing in said second operating position;

a conduit in fluid communication with said tank in the first housing and the emergency wash apparatus; and a means for delivering a substantially constant pressure flow of water from said tank, through the conduit, and out through the emergency wash apparatus.

2. The emergency apparatus of claim 1 wherein the emergency wash apparatus in the second housing is an eyewash fountain.

3. The emergency apparatus of claim 1 wherein the emergency wash apparatus in the second housing is a drench means.

4. The emergency apparatus of claim 1 wherein the emergency wash apparatus in the second housing is both an eyewash fountain and a drench means.

5. The emergency apparatus of claim 1 wherein the first housing contains an inner tank which holds the water transported to the work site.

6. The emergency apparatus of claim 1 wherein the apparatus further comprises a switch means for starting the pump upon engaging the emergency wash apparatus.

7. The emergency apparatus of claim 1 wherein the emergency wash apparatus in the second housing is both an eyewash fountain and a drench means, and the emergency apparatus further comprises a switch means for starting the pump upon engaging either the eyewash fountain or drench means.

8. The emergency apparatus of claim 1 wherein the eyewash fountain comprises a pair of spray heads for spraying a pair of eyes, and the drench means comprises a nozzle.

9. A mobile eyewash apparatus transportable by a pickup truck having a bed comprising:
   (a) a first housing removably supportable within the bed of said pickup truck;
   (b) a tank accessibly enclosed by the first housing;
   (c) a second housing carried by a frame slidably and rotatably mounted to the first housing, said second housing being movable between a first position at which the second housing is secured vertically above said first housing and a second position at which the second is horizontally spaced from the first housing;
   (d) a means for locking the second housing in said second position;
   (e) an eyewash means in liquid communication with the tank for delivering water from the tank to the eyes of a person, wherein the eyewash means is enclosable within the second housing; and
   (f) a pump disposed in fluid communication with said tank and said eyewash means.

10. The mobile eyewash apparatus of claim 9 wherein the apparatus further comprises a switch means for starting the pump upon engaging the eyewash means.

11. The mobile eyewash apparatus of claim 9 wherein the eyewash means comprises a pair of spray heads for spraying a pair of eyes.

12. The mobile eyewash apparatus of claim 11 wherein the apparatus further comprises a switch means for starting the pump upon engaging the eyewash means.

13. A mobile bodysplash apparatus transportable by a pickup truck having a bed, comprising:
   (a) a first housing removably disposed on the bed of said pickup truck;
   (b) a tank accessibly enclosed by the first housing;
   (c) a second housing carried by a frame slidable and rotatably mounted to the first housing, said second housing being movable from a first traveling position at which the second housing is secured vertically above said first housing and a second operating position at which the second housing is horizontally spaced from said first housing;
   (d) a means for locking the second housing in said second operating position;
   (e) a drenching means in liquid communication with the tank for delivering water from the tank to the skin of a person, wherein the drenching means is enclosable within the second housing, and
   (f) a pump disposed in fluid communication with said tank and said drenching means.

14. The mobile eyewash apparatus of claim 13 wherein the apparatus further comprises a switch means for starting the pump upon engaging the drenching means.

15. The mobile eyewash apparatus of claim 13 wherein the drenching means comprises a hose and nozzle.

16. The mobile eyewash apparatus of claim 15 wherein the apparatus further comprises a switch means for starting the pump upon engaging the drenching means.

* * * * *